March 14, 1961     J. W. KREUTTNER     2,974,680

VALVE

Filed Feb. 5, 1959

INVENTOR.
JOSEPH W. KREUTTNER
BY
Pollard Johnston Sny the & Robertson
ATTORNEYS

United States Patent Office 2,974,680
Patented Mar. 14, 1961

2,974,680

VALVE

Joseph W. Kreuttner, North Tarrytown, N.Y., assignor, by mesne assignments, to Buensod-Stacey Corporation, a corporation of Ohio Filed Feb. 5, 1959, Ser. No. 791,435

15 Claims. (Cl. 137—595)

The present invention relates to air conditioning systems, and particularly to a new and improved fluid volume regulating valve and to a control therefor that can be adjusted in a manner to reduce to a minimum the audible noise occasioned by fluid flowing past an obstructing object, as well as to provide an extremely sensitive control for the valve.

While the present invention can be employed in conjunction with low-pressure air conditioning systems, it is particularly useful when it is employed with high-pressure arrangements. It can be used as described hereinafter in conjunction with high pressure systems in which the size of the ducts leading to the volume regulators has a maximum diameter of about two inches to six inches, or the equivalent, the pressure being about two inches of water static pressure and the potential velocity of air in the ducts being between about 1500 and 3500 feet per minute, although these values may vary slightly from what is given in what is known as a high pressure system.

An object of the invention is to provide a fluid volume regulator including a control valve for varying the quantity of fluid flowing through a duct within an air conditioning system or the like.

Another object is to provide such a fluid control valve in which a minimum of noise is occasioned by the flow of the fluid past the valve both while it is in an adjusted position and also, and particularly, during the increasing and decreasing of fluid flow past it during the adjustment of the valve.

Another object is to provide such a fluid control valve in which a gradual and progressive increase and decrease of fluid flow will occur past a cross-section of the duct within which the valve is located when it is adjusted from one position to another.

One aspect of the invention may be to provide a stationary frame member within a duct through which fluid is being forced. The frame member may support in fixed relation a plurality of spaced vanes or obstructions to the flow of fluid. These vanes or obstructions may comprise spaced louvers fixed within the frame and each, for example, may posses a teardrop cross-sectional form. They may be mounted in the frame member with their pointed ends extending downstream in the duct within which they are located.

Another frame member may also be located within the duct. It may be movably mounted, and it may support a plurality of spaced vanes or obstructions that may be similar to the louver obstructions fixed within the first frame member. The movably mounted frame member may be moved along a path that will effect a progressive cooperation between the louvers on it and those on the stationary frame member. While the movement of the movable frame member may be along any path that will provide the desired effect, it will be shown and described as being pivotally mounted within the duct in cooperating position relatively to the stationary frame member. The mounting for, and the spacing of the louver obstructions on the movable frame member may be such that they intermesh with those mounted within the stationary frame member. In this way, cooperation between the stationary and movable obstructions is such that during the movement of the movable member from a maximum open position where a maximum fluid flow occurs to a position where minimum fluid flow exists, there is provided a gradual closing off of the fluid flow from a point nearest the pivot of the pivotally mounted movable member toward the non-pivoted end thereof. Such an action provides a gradual and progressive variation in the fluid flow as succeeding obstructions cooperate progressively with their mating obstructions. Furthermore, as each obstruction gradually moves into cooperation with its mating obstruction, and due to the teardrop cross-section of each, a plurality of separate throttling means are progressively rendered effective. Accordingly, the pivotal frame member provides a progressive and gradual obstruction to the flow of fluid through the duct, consequently producing a minimum of noise during the adjustment of the control.

Another aspect of the invention may be to provide such a movable valve or regulator construction in separate ducts that lead to a mixing chamber to thereby control two separate fluids desired to be mixed in controlled proportions within a mixing chamber. Each of the regular valves may be substantially identical and located in separate ducts upstream from a mixing chamber. Each may include a stationary and movable frame member having spaced intermeshing louvers therein, each of which louvers may possess a teardrop cross-sectional construction.

In still another aspect of the invention, the volume regulating valve may comprise separate stationary frames having spaced louvers therein of teardrop cross-sectional construction, one in an inlet duct and the other in an outlet duct separated by a common wall. Another frame may be provided with a pivot that lies in the plane of the common wall so that one half of the pivotal frame lies in the inlet duct and the other half lies in the outlet duct. Furthermore, the louvers on each side of the pivot for both the pivotal frame and the stationary frames may have their pointed edges extending in opposite directions.

The above, other objects and novel features of the regulator valve will become apparent from the following specification and accompanying drawings which are merely exemplary.

Figure 1:
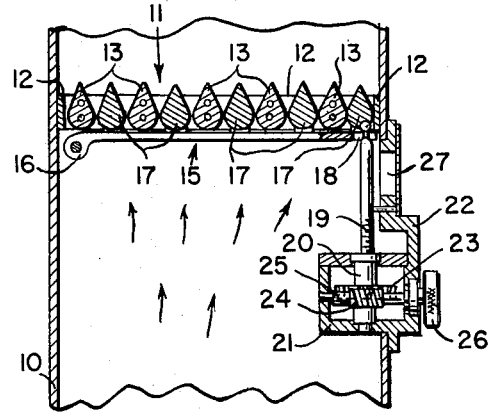
Fig. 1 is a sectional elevational view of an air conditioning duct having mounted therein a regulator valve embodying the principles of the invention.

Referring to Fig. 1, the principles of the invention are shown as applied to an air conditioning system including a duct 10 through which conditioned air is adapted controllably to flow to a zone or room to be conditioned. A frame 11 may comprise four sides 12 that may snugly fit within the duct 10 and be fixed therein by riveting, bolting or the like. A plurality of louvers 13 may be fixedly mounted in the frame 11.

Figure 2:
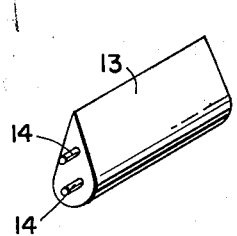
Fig. 2 is a perspective view of one of the louvers having a teardrop cross-sectional construction.

Referring to Fig. 2, the louver 13 may comprise an elongated element having a transverse cross-sectional construction simulating a teardrop. Each end of the louver may be provided with one or more fastening pins 14 or the like that may extend into mating holes within opposed walls of the frame 11.

A flat frame 15 may be provided with a pivotal mounting 16 adjacent one of the sidewalls of the duct 10, and it may support a plurality of spaced louvers 17 that may extend over at least a portion of opposed side members of the frame 15. The ends of the louvers 17 that extend over the opposed side members of the frame 15 may be fixed thereto in any desired manner. The spacing of the louvers 17 is staggered relatively to the louvers 13 so that upon pivotal movement of frame 15, the respective louvers move into and out of meshing relation.

The side member of frame 15 opposite that which is provided with the pivotal mounting 16 may include a recess or slot 18 through which may extend one end of a threaded shaft 19. Spaced enlargements may be provided on the end of shaft 19 on each side of frame 15 and the construction may be such that vertical movement of the screw 19 will effect the pivotal movement of the frame 15 to cause cooperation between the louvers 13 and 17 in a manner progressively to render them effective and consequently to provide a progressive increase and decrease in the flow of fluid past the regulating valve.

This progressive increase and decrease in the fluid flow is two-fold. By virtue of the teardrop cross-sectional construction of the louvers 13 and 17, as they are individually brought into, or moved out of mesh with their mating louvers, a progressive diminution or increase in the fluid flow occurs. However, due to the pivotal action of the frame 15, a further progressive action between the louvers 13 and 17 occurs across the regulating valve which involves the successive intermeshing of the louvers 13 and 17 from the pivotal mounting 16 toward the screw 19 when the frame 15 is moved toward a position of minimum fluid flow. When frame 15 is moved toward a position of maximum flow, the separation of the louvers 13 and 17 progresses from the screw 19 toward the pivotal mounting 16. In this way, a progressive diminution and increase in the flow of fluid across the regulating valve occurs which reduces to a minimum the noise incident to the flow of fluid past the valve.

In order to effect movement of the threaded shaft 19, a threaded nut 20 may be mounted for rotation in bearings within a housing 21 that forms part of a removable bracket 22 that may extend into an opening within, and be fixed to a wall of, the duct 10. The nut 20 may have fixed to it a worm gear 23 that may mesh with a worm 24. The worm 24 may be fixed to a shaft 25 that is journaled in bearings within the housing 21.

A handwheel 26 may be fixed to the shaft 25 exteriorly of the housing 21. From the foregoing it is evident that rotation of the handwheel 26 will cause pivoting of the frame 15 about the pivot 16. A window 27 may be provided in the bracket 22 to observe the location of the frame 15 during its adjustment.

Figure 3:
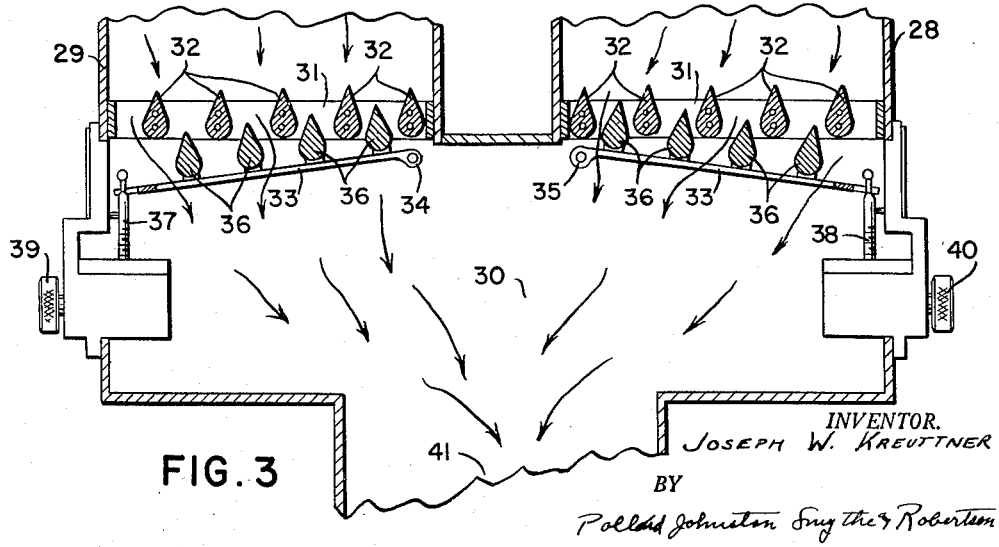
Fig. 3 is a sectional elevational view of separate ducts leading to a mixing chamber, and in which each duct includes a regulator valve embodying the principles of the invention.

Referring to Fig. 3, the principles of the invention are shown as applied to separate ducts 28 and 29 that lead to a common mixing chamber 30. Frames 31 similar to the frame 11 may be mounted within the ducts 28 and 29 upstream from the point where each exhausts into the mixing chamber 30. Louvers 32 similar to louvers 13 may be fixedly mounted within frames 31 in the same manner that louvers 13 are fixed in frame 11. As shown in Fig. 3, the pointed ends of the louvers 32 extend upstream, although they may with equal facility be pointed downstream.

Separate frames 33 may be pivotally mounted in cooperating position relatively to their corresponding frames 31 in the same manner that frame 15 is mounted on pivot 16. In the embodiment shown in Fig. 3, the frames 33 are mounted on pivots 34 and 35 within the mixing chamber 30, although they may be located within their corresponding ducts 29 and 28 if the frames 31 are located farther upstream therein.

Each of the frames 33 may have fixed to it spaced louvers 36 similar to the louvers 17 that are fixed to the frame 15, and they may be spaced in a staggered relationship relatively to the louvers 32 so that they cooperate with their corresponding louvers 32 in the same way that the louvers 17 cooperate with the louvers 13. The side member of each frame 33 opposite that supported by the pivots 34 and 35 may be provided with a connection to axially movable threaded shafts 37 and 38, respectively, that may be reciprocated by handwheels 39 and 40, respectively, in the same way that the threaded shaft 19 is reciprocated by the rotation of handwheel 26.

From the foregoing it is evident that predetermined quantities of the fluid supplied to ducts 28 and 29 can be introduced into the mixing chamber 30 for delivery to a duct 41 that may lead to a zone or room to be conditioned. Furthermore, the adjustment of each of the regulators within ducts 28 and 29 may be independent of the other although the adjustment of each will produce the advantageous results that are obtained with the regulating valve of Fig. 1. These results include the progressive diminution and increase in flow across each regulating valve in a substantially noiseless manner, and the progressive variation in the fluid flow through the individual mating louvers 32 and 36 due to their teardrop cross-sectional construction.

Figure 4:
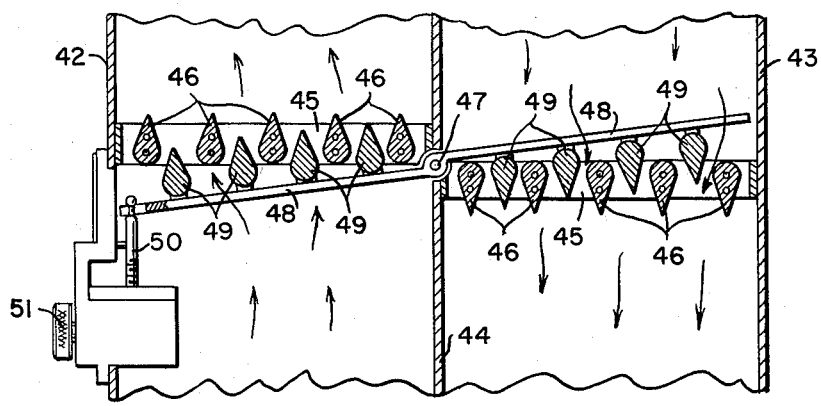
Fig. 4 is a sectional elevational view of a duct including a modified form of a regulator valve to which the principles of the invention have been applied.

Referring to Fig. 4, the principles of the invention are shown as applied to a system including two ducts 42 and 43 having a common separating wall 44. The duct 42 may be an inlet duct to a room or zone to be conditioned, and the duct 43 may be an outlet from the room or zone. Or, both ducts 42 and 43 may lead to a mixing chamber similar to the chamber 41. Each of the ducts 42 and 43 may be provided with a stationary frame 45 similar to the frames 31, but spaced slightly along its corresponding duct as shown. Each frame may support spaced louvers 46 with their pointed ends extending in the same or opposite directions. A pivot bearing 47 may be located in the plane including the common wall 44, and an integral frame 48 mounted on the pivot bearing 47 may extend in opposite directions from the bearing 47 across the ducts 42 and 43. Spaced louvers 49 may be mounted on opposite faces of the frame 48 on opposite sides of the bearing 47 for cooperation with their corresponding louvers 46.

The one side member of the frame 48 may be provided with a connection to an axially reciprocable threaded shaft 50 in the same way that frame 15 is connected to shaft 19. Reciprocation of shaft 50 may be effected by turning a handwheel 51 in the same way that shaft 19 is reciprocated by turning the handwheel 26.

From the foregoing it is evident that adjustment of the frame 48 will provide a substantially equal flow of fluid within the ducts 42 and 43 and that all of the advantages derived from the constructions shown in Figs. 1 and 3 will be equally obtained by the construction shown in Fig. 4.

Although the various features of the improved regulating valve have been shown and described in detail to fully disclose several embodiments of the invention, it will be evident that numerous changes can be made in such details, and certain features may be used without others without departing from the principles of the invention.

What is claimed is:

1. In a system including duct means through which fluid is adapted to flow, a fluid flow regulator including a frame member stationarily mounted within said duct means; spaced louvers mounted on said frame member; a second frame member movably mounted within said duct means; louvers mounted on said second frame member in spaced staggered relation to the louvers on said stationary frame member and adapted to intermesh with corresponding louvers on said stationary frame member; and means for moving said second frame member toward and from said stationary frame member along a path that renders said intermeshing louvers progressively variably effective.

2. In a system including duct means through which fluid is adapted to flow, a fluid flow regulator including a frame member stationarily mounted within said duct means; spaced louvers having teardrop cross-sections mounted on said frame member; a second frame member movably mounted within said duct means; louvers having teardrop cross-section mounted on said second frame member in spaced staggered relation to the louvers on said stationary frame member and adapted to intermesh with corresponding louvers on said stationary frame member; and means for moving said second frame member toward and from said stationary frame member along a path that renders said intermeshing louvers progressively variably effective.

3. In a system including duct means through which fluid is adapted to flow, a fluid flow regulator including a frame member stationarily mounted within said duct means; spaced louvers mounted on said frame member; a second frame member movably mounted within said duct means; louvers mounted on said second frame member in spaced staggered relation to the louvers on said stationary frame member and adapted to intermesh with corresponding louvers on said stationary frame member; and means for moving said second frame member toward and from said stationary frame member along an arcuate path that renders said intermeshing louvers progressively variably effective.

4. In a system including duct means through which fluid is adapted to flow, a fluid flow regulator including a frame member stationarily mounted within said duct means; spaced louvers mounted on said frame member; a second frame member pivotally mounted within said duct means; louvers mounted on said second frame member in spaced staggered relation to the louvers on said stationary frame member and adapted to intermesh with corresponding louvers on said stationary frame member; and means for moving said second frame member about said pivotal mounting toward and from said stationary frame member to thereby render said intermeshing louvers progressively variably effective.

5. In a system including duct means through which fluid is adapted to flow, a fluid flow regulator including a frame member stationarily mounted within said duct means; spaced louvers having teardrop cross-sections mounted on said frame member; a second frame member pivotally mounted within said duct means; louvers having teardrop cross-sections mounted on said second frame member in spaced staggered relation to the louvers on said stationary frame member and adapted to intermesh with corresponding louvers on said stationary frame member; and means for moving said second frame member about said pivotal mounting toward and from said stationary frame member to thereby render said intermeshing louvers progressively variably effective.

6. In a system including a plurality of duct means exhausting into a mixing chamber, a fluid flow regulator in each of said duct means upstream from said mixing chamber, each regulator including a frame member stationarily mounted within its corresponding duct means; spaced louvers mounted on said stationary frame members; a second frame member movably mounted within each duct means in cooperating position relatively to its corresponding stationary frame member; louvers mounted on said movable frame members in spaced staggered relation to, and adapted to intermesh with the louvers on its corresponding stationary frame member; and means for moving said movable frame members along paths that render said intermeshing louvers progressively variably effective.

7. In a system including a plurality of duct means exhausting into a mixing chamber, a fluid flow regulator in each of said duct means upstream from said mixing chamber, each regulator including a frame member stationarily mounted within its corresponding duct means; spaced louvers having teardrop cross-sections mounted on said stationary frame members; a second frame member movably mounted within each duct means in cooperating position relatively to its corresponding stationary frame member; louvers having teardrop cross-sections mounted on said movable frame members in spaced staggered relation to, and adapted to intermesh with louvers on its corresponding stationary frame member; and means for moving said movable frame members along paths that render said intermeshing louvers progressively variably effective.

8. In a system including a plurality of duct means exhausting into a mixing chamber, a fluid flow regulator in each of said duct means upstream from said mixing chamber, each regulator including a frame member stationarily mounted within its corresponding duct means; spaced louvers mounted on said stationary frame members; a second frame member movably mounted within each duct means in cooperating position relatively to its corresponding stationary frame member; louvers mounted on said movable frame members in spaced staggered relation to, and adapted to intermesh with the louvers on its corresponding stationary frame member; and means for moving said movable frame members along arcuate paths that render said intermeshing louvers progressively variably effective.

9. In a system including a plurality of duct means exhausting into a mixing chamber, a fluid flow regulator in each of said duct means upstream from said mixing chamber, each regulator including a frame member stationarily mounted within its corresponding duct means; spaced louvers mounted on said stationary frame members; a second frame member pivotally mounted within each duct means in cooperating position relatively to its corresponding stationary frame member; louvers mounted on said pivotal frame members in spaced staggered relation to, and adapted to intermesh with the louvers on its corresponding stationary frame member; and means for moving said pivotal frame members to cause said intermeshing louvers to be progressively variably effective.

10. In a system having a plurality of duct means exhausting into a mixing chamber, a fluid flow regulator in each of said duct means upstream from said mixing chamber, each regulator including a frame member stationarily mounted within its corresponding duct means; spaced louvers having teardrop cross-sections mounted on said stationary frame members; a second frame member pivotally mounted within each duct means in cooperating position relatively to its corresponding stationary frame member; louvers having teardrop cross-sections mounted on said pivotal frame members in spaced staggered relation to, and adapted to intermesh with the louvers on its corresponding stationary frame member; and means for moving said pivotal frame members to render said intermeshing louvers progressively variably effective.

11. In a system including separate duct means arranged side by side, separate frame members stationarily mounted within each of said duct means; spaced louvers mounted on said frame members; separate movable frame members mounted in each of said duct means; louvers mounted on said movable frame members in spaced staggered relation to the louvers on their corresponding stationary frame members and adapted to intermesh with corresponding louvers on their corresponding stationary frame members; and common means for simultaneously moving said movable frame members along paths that render said intermeshing louvers progressively variably effective.

12. In a system including separate duct means arranged side by side, separate frame members stationarily mounted within each of said duct means; spaced louvers having teardrop cross-sections mounted on said frame members; separate movable frame members mounted in each of said duct means; louvers having teardrop cross-sections mounted on said movable frame members in spaced staggered relation to the louvers on their corresponding stationary frame members and adapted to intermesh with corresponding louvers on their corresponding stationary frame members; and common means for simultaneously moving said movable frame members along paths that render said intermeshing louvers progressively variably effective.

13. In a system including separate duct means arranged side by side, separate frame members stationarily mounted within each of said duct means; spaced louvers mounted on said frame members; separate movable frame members mounted in each of said duct means; louvers mounted on said movable frame members in spaced staggered relation to the louvers on their corresponding stationary frame members and adapted to intermesh with corresponding louvers on their corresponding stationary frame members; and common means for simultaneously moving said movable frame members along arcuate paths that render said intermeshing louvers progressively variably effective.

14. In a system including separate duct means arranged side by side, separate frame members stationarily mounted within each of said duct means; spaced louvers mounted on said frame members; a pivotal bearing between said duct means; integral frame means extending in each direction from said pivotal bearing into each duct means; louvers mounted on said integral frame means in spaced staggered relation to the louvers on their corresponding stationary frame members and adapted to intermesh with corresponding louvers on their corresponding stationary frame members; and means for moving said integral frame means about said pivotal bearing in a manner to render said intermeshing louvers progressively variably effective.

15. In a system including separate duct means arranged side by side, separate frame members stationarily mounted within each of said duct means; spaced louvers having teardrop cross-sections mounted on said frame members; a pivotal bearing between said duct means; integral frame means extending in each direction from said pivotal bearing into each duct means; louvers having teardrop cross-sections mounted on said integral frame means in spaced staggered relation to the louvers on their corresponding stationary frame members and adapted to intermesh with corresponding louvers on their corresponding stationary frame members; and means for moving said integral frame means about said pivotal bearing in a manner to render said intermeshing louvers progressively variably effective.

References Cited in the file of this patent

UNITED STATES PATENTS

| | | |
|---|---|---|
| 1,078,337 | Douglas | Nov. 11, 1913 |
| 2,314,167 | Shaw | Mar. 16, 1943 |
| 2,587,997 | Schach | Feb. 26, 1952 |
| 2,675,025 | Wynkoop | Apr. 13, 1954 |
| 2,759,490 | Phillips | Aug. 21, 1956 |